US011028523B2

(12) United States Patent
Kim et al.

(10) Patent No.: US 11,028,523 B2
(45) Date of Patent: Jun. 8, 2021

(54) LAUNDRY TREATING APPARATUS HAVING A CLEANING NOZZLE AND METHOD FOR CONTROLLING THE SAME

(71) Applicant: LG ELECTRONICS INC., Seoul (KR)

(72) Inventors: Taewan Kim, Seoul (KR); Hyunchul Choi, Seoul (KR); Wonjong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 36 days.

(21) Appl. No.: 15/388,490

(22) Filed: Dec. 22, 2016

(65) Prior Publication Data

US 2017/0191208 A1  Jul. 6, 2017

(30) Foreign Application Priority Data

Jan. 5, 2016 (KR) .................. 10-2016-0001213

(51) Int. Cl.
*D06F 39/08* (2006.01)
*D06F 58/22* (2006.01)
(Continued)

(52) U.S. Cl.
CPC ............ *D06F 39/088* (2013.01); *D06F 25/00* (2013.01); *D06F 33/00* (2013.01); *D06F 37/22* (2013.01);
(Continued)

(58) Field of Classification Search
CPC ............................... D06F 58/206; D06F 58/22
See application file for complete search history.

(56) References Cited

U.S. PATENT DOCUMENTS

2007/0145941 A1* 6/2007 Asada .................. D06F 37/304
318/811
2011/0167662 A1 7/2011 Dittmer et al.
(Continued)

FOREIGN PATENT DOCUMENTS

CN          1994522        7/2007
CN         101088449      12/2007
(Continued)

OTHER PUBLICATIONS

WO2014016879A1 Machine Translation (also published as DE112012006737 as indicated in the translation) (Year: 2014).*
(Continued)

*Primary Examiner* — Spencer E Bell
(74) *Attorney, Agent, or Firm* — KED & Associates LLP

(57) ABSTRACT

Provided is a laundry treating apparatus having a cleaning nozzle and a method for controlling the cleaning nozzle. The laundry treating apparatus may include a main body having a tub, and a circulation path formed outside the tub to circulate air from the tub along the circulation path outside the tub. A cleaning nozzle may be provided at the circulation path, and configured to inject water. A water supply passage may be provided having one side connected to a water supply source and another side connected to the cleaning nozzle. A water supply valve may be provided to open and close the water supply passage. A controller may control the water supply valve to supply water to the cleaning nozzle. The controller may control the water supply valve to supply water to the cleaning nozzle during a drain course among a plurality of drain courses.

19 Claims, 13 Drawing Sheets

(51) Int. Cl.
| | | |
|---|---|---|
| *D06F 58/20* | (2006.01) | |
| *D06F 33/00* | (2020.01) | |
| *D06F 25/00* | (2006.01) | |
| *D06F 37/22* | (2006.01) | |
| *D06F 58/30* | (2020.01) | |
| *D06F 58/50* | (2020.01) | |
| *D06F 103/38* | (2020.01) | |

(52) U.S. Cl.
CPC .......... *D06F 58/203* (2013.01); *D06F 58/206* (2013.01); *D06F 58/22* (2013.01); *D06F 39/083* (2013.01); *D06F 58/30* (2020.02); *D06F 58/50* (2020.02); *D06F 2103/38* (2020.02)

(56) References Cited

U.S. PATENT DOCUMENTS

| | | | | |
|---|---|---|---|---|
| 2012/0090189 A1* | 4/2012 | Kwon | .................... | D06F 25/00 34/82 |
| 2012/0246960 A1* | 10/2012 | Lee | ................. | D06F 58/206 34/86 |
| 2013/0219734 A1 | 8/2013 | Kim et al. | | |
| 2013/0276327 A1 | 10/2013 | Doh et al. | | |
| 2014/0150279 A1 | 6/2014 | Kwon et al. | | |

FOREIGN PATENT DOCUMENTS

| | | |
|---|---|---|
| CN | 102519118 | 6/2012 |
| CN | 104060432 | 9/2014 |
| CN | 104487621 | 4/2015 |
| DE | 10-2014-204299 | 9/2015 |
| EP | 0 816 549 | 1/1998 |
| EP | 2 669 417 | 12/2013 |
| EP | 2 868 792 | 5/2015 |
| JP | 2006-187449 | 7/2006 |
| JP | 2007-306960 | 11/2007 |
| JP | 2010-035894 | 2/2010 |
| JP | 2010-094226 | 4/2010 |
| JP | 2013-085684 A | 5/2013 |
| JP | 2013-085687 A | 5/2013 |
| JP | 2013-128527 | 7/2013 |
| JP | 2013-169267 A | 9/2013 |
| KR | 10-2014-0095741 | 8/2014 |
| KR | 10-2015-0026548 | 3/2015 |
| WO | WO 2014-016879 | 1/2014 |
| WO | WO 2014/017004 | 1/2014 |

OTHER PUBLICATIONS

Korean Search Report dated Feb. 23, 2017 issued in Application No. PCT/KR2016/012813.
European Search Report dated May 11, 2017 issued in Application No. 17150241.2.
Chinese Office Action dated Aug. 22, 2018 issued in Application No. 2016112344491.1 (English translation attached).
Russian Office Action dated Nov. 19, 2018 issued in Application No. 2018128300 (English translation attached).
Japanese Office Action dated Jan. 5, 2021 issued in Application 2018-533917.

* cited by examiner

LAUNDRY TREATING APPARATUS HAVING A CLEANING NOZZLE AND METHOD FOR CONTROLLING THE SAME

CROSS-REFERENCE TO RELATED APPLICATION(S)

Pursuant to 35 U.S.C. § 119(a), this application claims the benefit of an earlier filing date of and the right of priority to Korean Application No. 10-2016-0001213, filed on Jan. 5, 2016, the contents of which are incorporated by reference herein in its entirety.

BACKGROUND

1. Field

Provided is a laundry treating apparatus having a cleaning nozzle, and a method for controlling the same.

2. Background

Laundry treating apparatuses having a cleaning nozzle, and methods for controlling the same are known. However, they suffer from various disadvantages.

BRIEF DESCRIPTION OF THE DRAWINGS

Embodiments will be described in detail with reference to the following drawings in which like reference numerals refer to like elements, and wherein.

DETAILED DESCRIPTION

Figure 1:
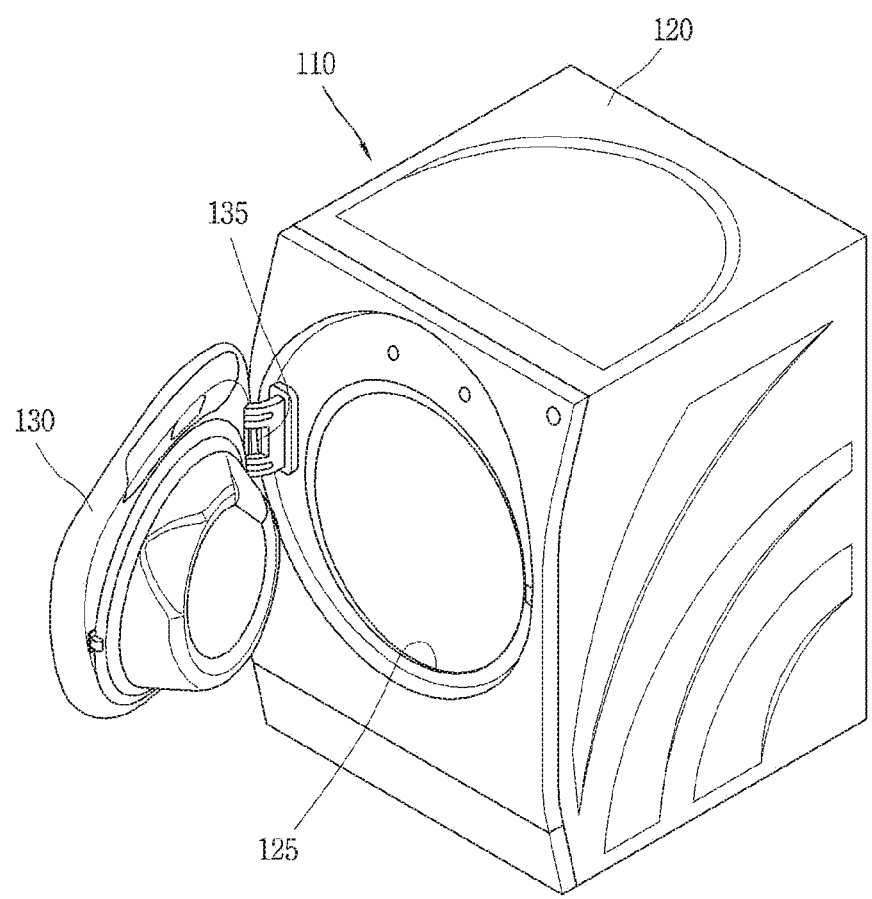
FIG. 1 is a perspective view of a laundry treating apparatus according to an embodiment.
Figure 2:
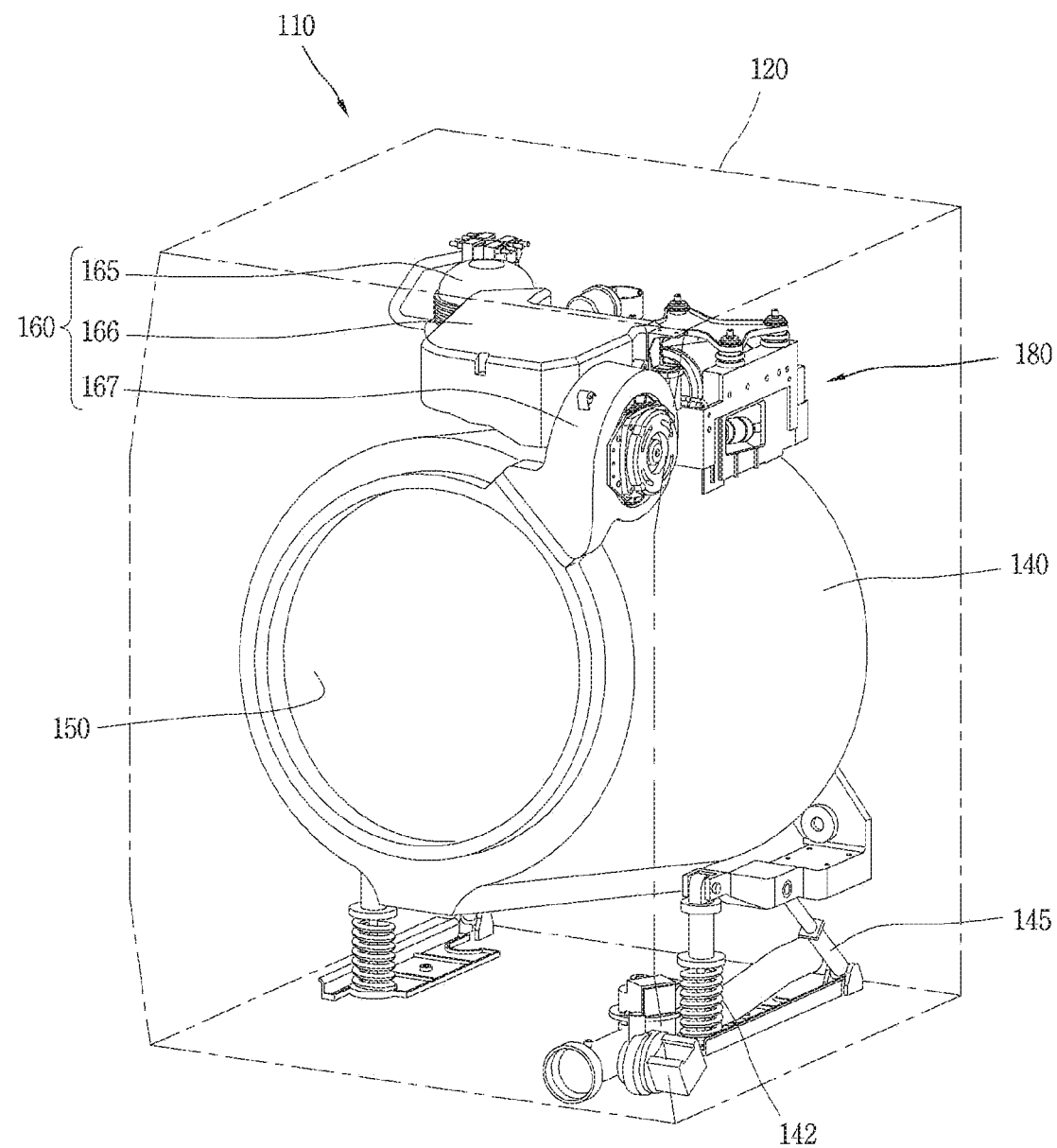
FIG. 2 is a perspective view which illustrates a main part of FIG. 1.

Hereinafter, embodiments of the present disclosure will be explained with reference to the accompanying drawings.

In describing the present invention, detailed description will be omitted when a specific description for publicly known technologies to which the invention pertains is judged to obscure the gist of the present invention.

The attached drawings are merely provided for easy understanding of embodiments of the present invention. It should also be understood that technical features of the present invention are not limited by the attached drawings, and all changes and modifications that fall within the metes and bounds of the present invention, or equivalents of such metes and bounds are therefore intended to be embraced by the attached drawings.

A laundry treating apparatus serves to treat laundry or clothes through a washing process and a rinsing process. The laundry means not only clothes, but also washable items such as bedclothes like blankets, curtains, sewing, dolls, or the like.

The laundry treating apparatus may be provided with a dehydration function to remove moisture by rotating washed clothes or laundry at a preset speed. Some of laundry treating apparatuses may be provided with a drying function to dry washed clothes or laundry by supplying heated air thereto, as well as a washing function.

Some of the laundry treating apparatuses having a washing function and a drying function may include tubs, circulation paths configured to take air inside the tubs to the outside for treatment and then to re-introduce the treated air into the tubs, and drying modules provided at the circulation paths. Some of the drying modules may be provided with heat pumps. The drying module may be provided with a circulation fan for acceleration of an air flow. A lint filter, configured to collect lint from the air taken out from the tub, may be provided at the circulation path.

The heat pump may include an evaporator provided in the circulation path and configured to cool air, a condenser configured to heat the air, a compressor configured to provide a compressed refrigerant to the condenser, and an expansion device configured to expand a condensed refrigerant.

With such a configuration, once the circulation fan starts to be rotated as a drying function starts, air inside the tub is taken out, and then is heat-exchanged while passing through the evaporator. During this process, the air is cooled through heat exchange, and moisture included in the air is removed.

Then, the relatively dry air having moisture removed therefrom is heated while passing through the condenser, and is introduced into the tub to contact laundry inside a drum and to absorb moisture. The air which has absorbed moisture by contacting the laundry has the moisture removed by contacting the evaporator. Then, the air is heated by contacting the condenser, and absorbs moisture by re-contacting the laundry. These processes are repeatedly executed to dry the laundry. During this drying process, foreign materials such as lint, included in air, are attached to the lint filter and the evaporator.

In order to solve such a problem, has been proposed a method for removing lint by supplying water to the evaporator. Also proposed is a method for determining a cleaning time by arranging a contaminant sensor at a heat exchanger. Also proposed is a method for cleaning a heat exchanger when necessary by arranging a cleaning means near the heat exchanger.

However, such conventional laundry treating apparatuses may have various problems. For example, since there is no preset cleaning time, blowing efficiency and/or heat exchange efficiency may be lowered as foreign materials are attached to the lint filter and/or the heat exchanger. Further, a cleaning operation should be performed at a preset cleaning time after a washing course or a drying course is terminated, which may be inconvenient to the user.

Further, since a cleaning sensor or a contaminant sensor additionally provided may not sense a small amount of foreign materials attached to the lint filter and/or the heat exchanger, the lint filter and/or the heat exchanger may continue to operate in a state where the foreign materials have been attached thereto. This may lower the entire driving efficiency. The laundry treatment apparatus having a lint filter and method for cleaning the same as disclosed hereinafter addresses these and other deficiencies.

As shown in FIGS. 1 to 6, a laundry treating apparatus according to an embodiment may include a laundry treating apparatus main body 110 (also referred to herein as a main body 110) having a tub 140, and having a circulation path 160 along which air inside the tub 140 is circulated after being taken out of the tub 140; a cleaning nozzle 220 provided at the circulation path 160, and configured to inject water; a water supply passage 240 having one side connected to a water supply source 242 and having another side connected to the cleaning nozzle 220; a water supply valve 250 configured to open and close the water supply passage 240; and a controller 270 (refer to FIG. 9) configured to control the water supply valve 250 such that water is supplied to the cleaning nozzle 220.

The main body 110 may be provided with a cabinet 120 which forms appearance of the laundry treating apparatus. The cabinet 120 may be formed to have an approximate rectangular parallelepiped shape. An opening 125 may be formed on a front surface of the cabinet 120. A door 130 configured to open and close the opening 125 may be provided on the front surface of the cabinet 120. The door 130 may be formed to be rotatable right and left on the basis of a rotation shaft 135 disposed in upper and lower directions of the cabinet 120.

The tub 140 for storing water therein may be provided in the cabinet 120. The tub 140 may have a cylindrical shape having one open side. The tub 140 may be disposed such that the opening may be toward the front surface of the cabinet 120. A tub water supply passage along which washing water for washing laundry is supplied may be provided at the tub 140. A water discharge passage along which washing water inside the tub 140 is discharged may be provided below the tub 140.

The tub 140 may be supported by a plurality of elastic members 142 and dampers 146. With such a configuration, vibrations of the tub 140 may be attenuated. A drum 150 may be provided in the tub 140. The drum 150 may be rotated by a driving motor 145 disposed at a rear side of the tub 140 (refer to FIGS. 5 and 6).

Figure 3:
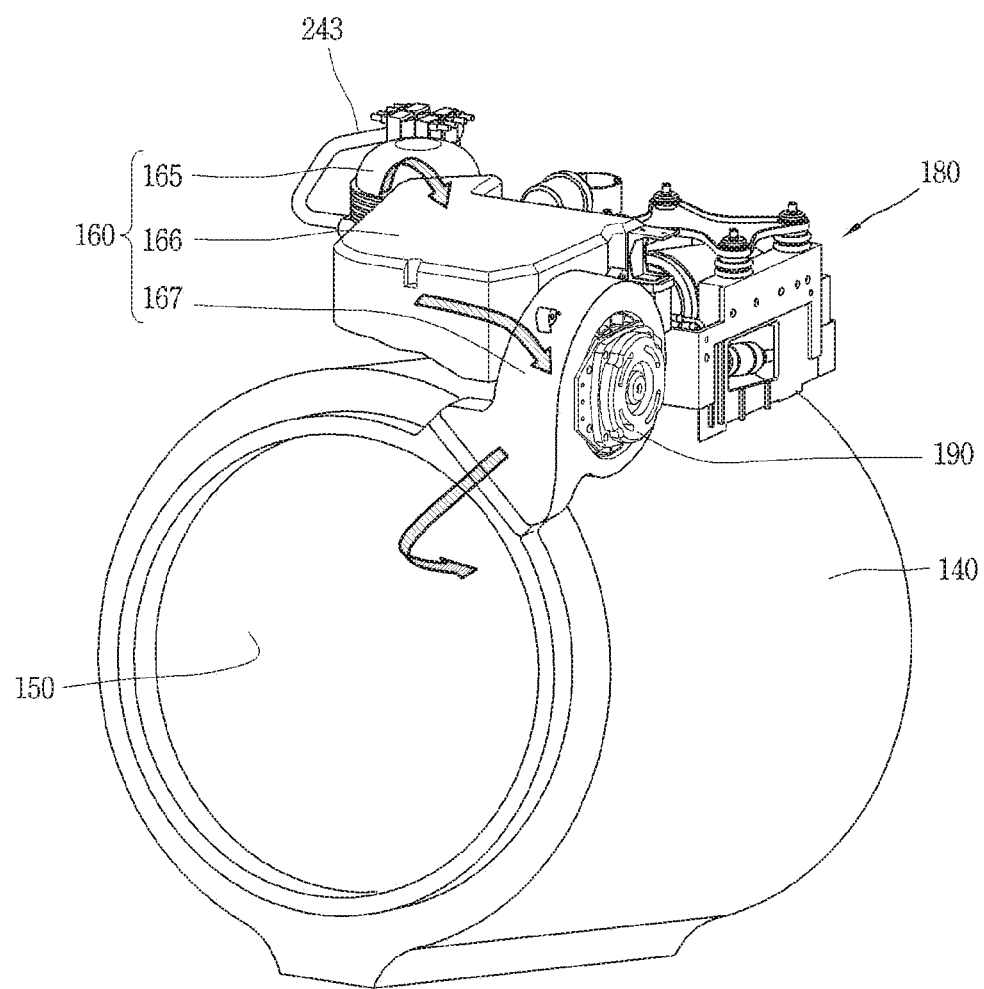
FIG. 3 is a view illustrating air circulation in the laundry treating apparatus of FIG. 2.
Figure 4:
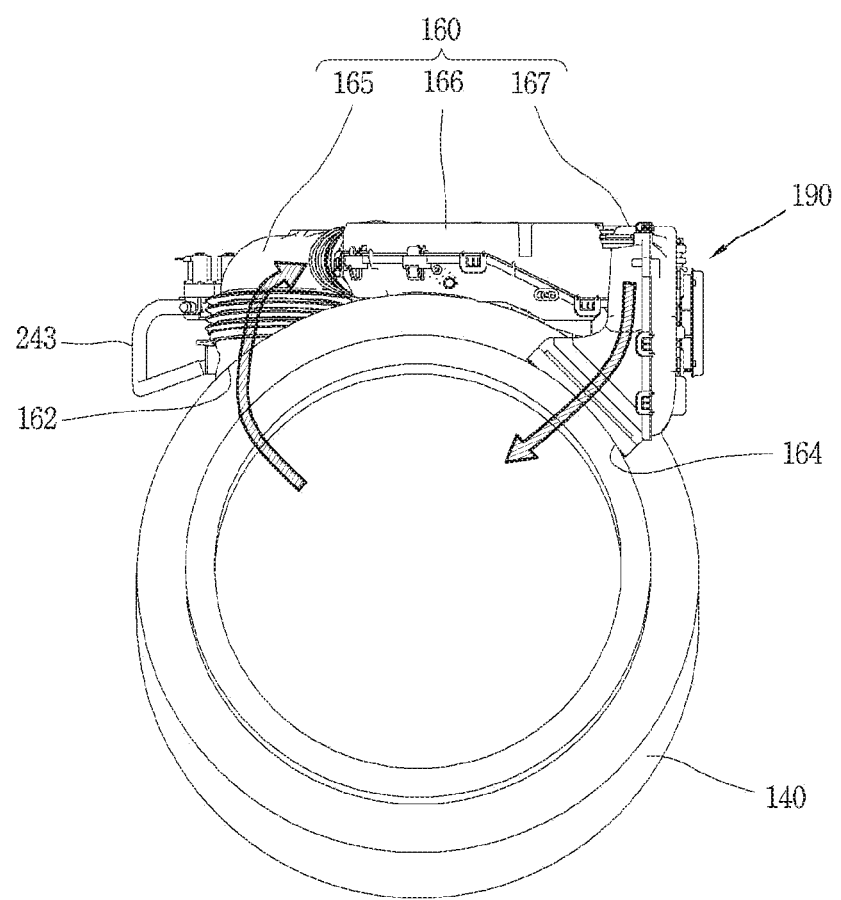
FIG. 4 is a frontal view of FIG. 3.

The circulation path 160, along which air inside the tub 140 is circulated after being taken out of the tub 140, may be formed outside the tub 140. Referring to FIGS. 3 and 4, the circulation path 160 may be configured such that air may be discharged from an upper rear side of the tub 140 and then may be introduced into a front side of the tub 140.

An outlet 162 through which air is discharged may be penetratingly-formed at the upper rear side of the tub 140. An inlet 164 through which air is introduced may be penetratingly-formed at an upper front side of the tub 140. The circulation path 160 may include a connection duct 165 connected to the outlet 162, a heat exchange duct portion 166 connected to the connection duct 165 for communication, and a fan duct portion 167 connected to the heat exchange duct portion 166 for communication.

Figure 5:
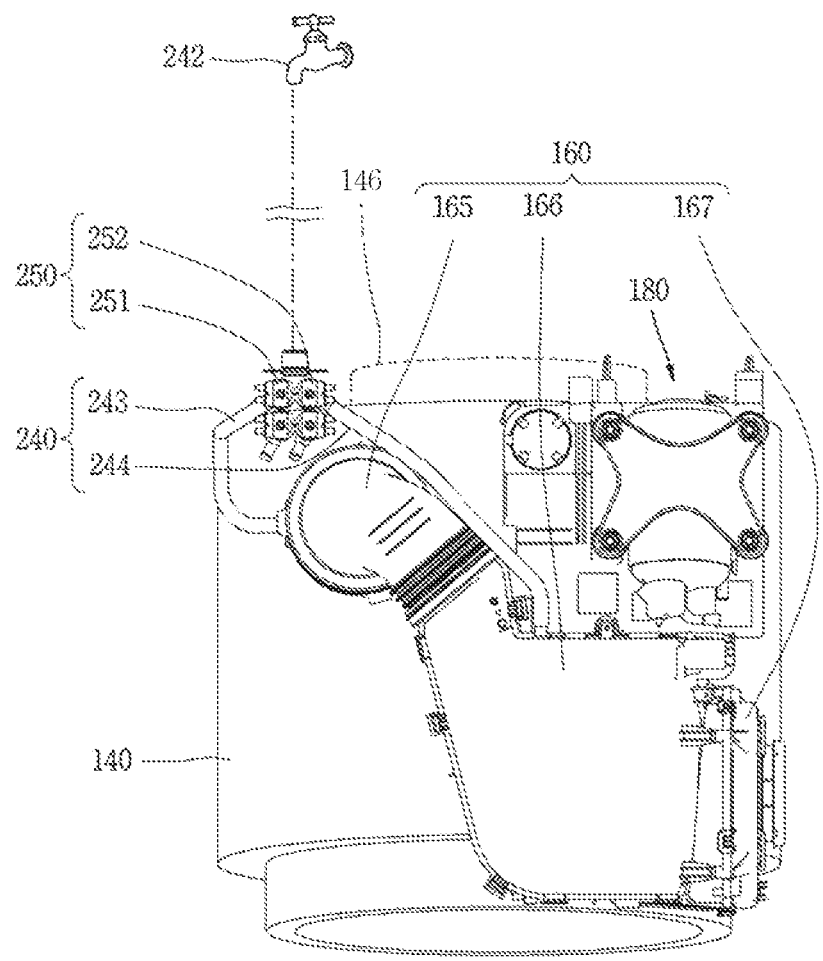
FIG. 5 is a planar view of FIG. 3.
Figure 6:
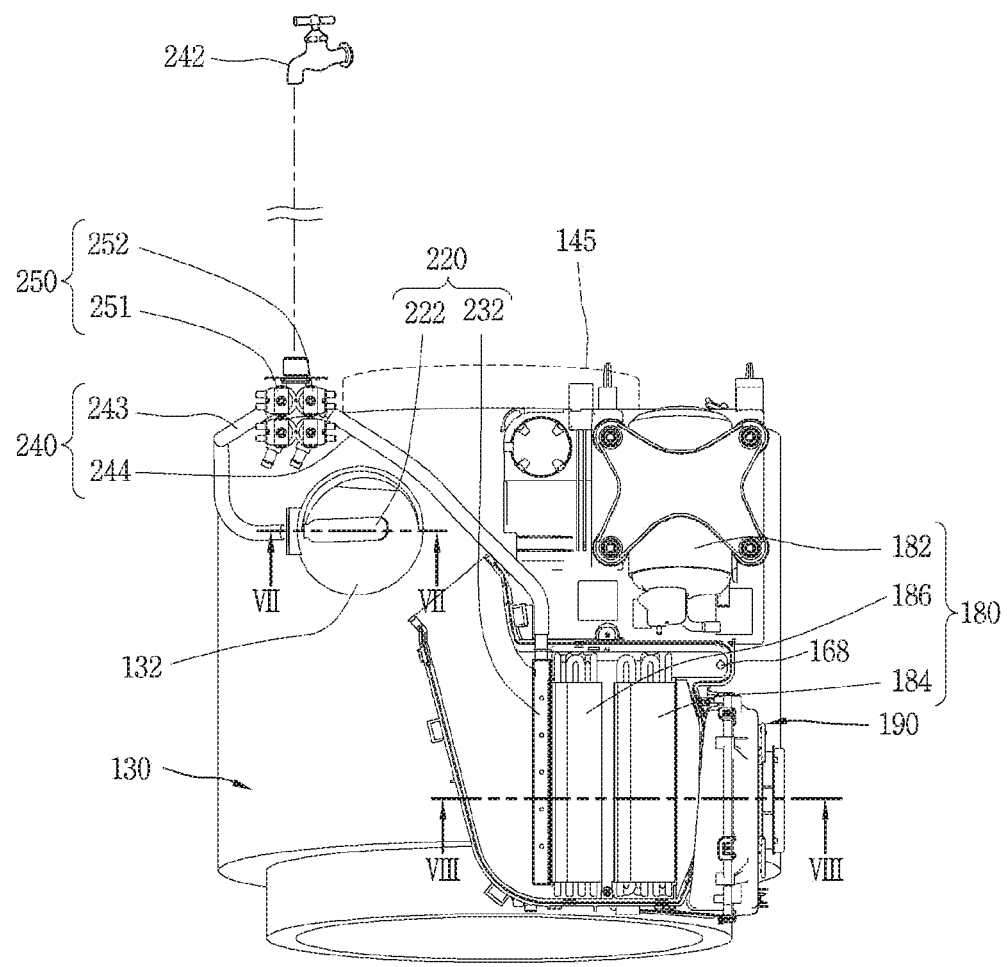
FIG. 6 is a partially-cut planar view illustrating the inside of a circulation path of FIG. 5.

A heat pump 180 heat-exchanged with air inside the circulation path 160 may be provided at one side of the circulation path 160. As shown in FIGS. 5 and 6, the heat pump 180 may be formed as a vapor compression type refrigeration cycle apparatus including a compressor 182 configured to compress a refrigerant, a condenser 184 configured to radiate the compressed refrigerant, an evaporator 186 configured to evaporate the refrigerant as the refrigerant absorbs latent heat, and an expansion device (not shown) configured to depressurize and expand the refrigerant.

The compressor 182 may be disposed at a rear side of the heat exchange duct portion 166 among an upper space of the tub 140. The evaporator 186 may be provided in the heat exchange duct portion 166. The condenser 184 may be provided in the heat exchange duct portion 166, at one side of the evaporator 186.

A circulation fan 190 configured to circulate air inside the tub 140 may be provided at one side of the condenser 184. The circulation fan 190 may be provided with a fan 192, and a fan driving motor 194 configured to rotate the fan 192 (refer to FIG. 7).

The evaporator 186 may be disposed at an upper stream side of the condenser 184, and the circulation fan 190 may be disposed at a lower stream side of the condenser 184, in a moving direction of air which circulates along the circulation path 160. With such a configuration, relatively high-temperature and humid air taken out of the tub 140 may be heat-exchanged with the evaporator 186 to thus be cooled. As a result, moisture inside the air may be removed.

Relatively low-temperature and dry air having passed through the evaporator 186 is heat-exchanged while passing through the condenser 184. As a result, the relatively low-temperature and dry air may become relatively high-temperature and dry air, and may be introduced into the tub 140.

Figure 7:
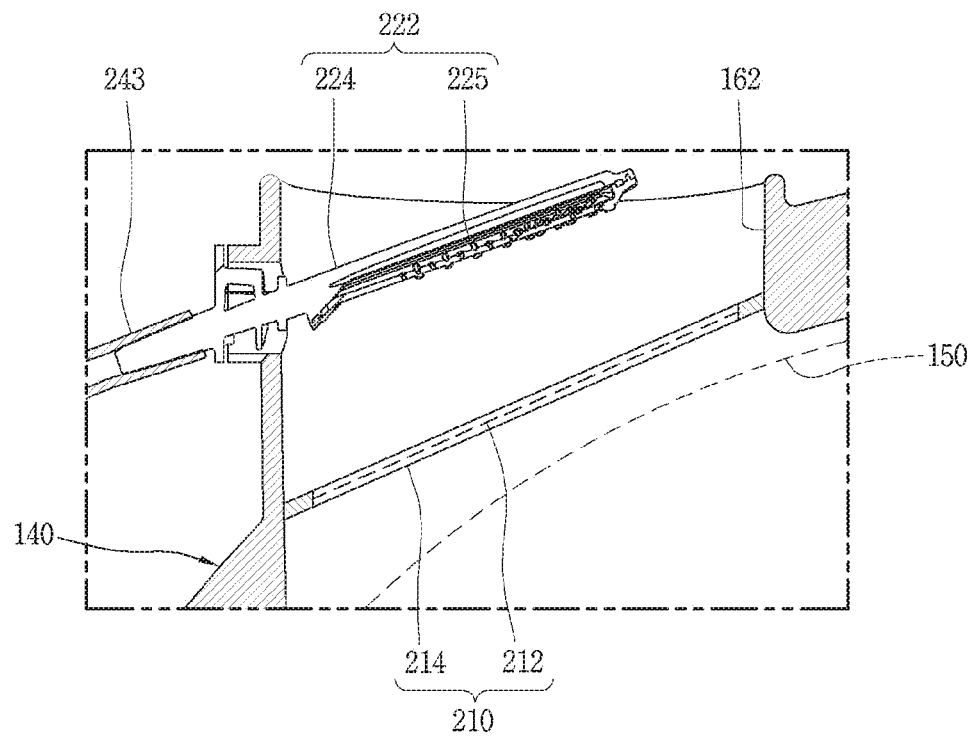
FIG. 7 is a sectional view taken along line 'VII-VII' in FIG. 6.

As shown in FIG. 7, a lint filter 210 configured to collect lint in air may be provided at the outlet 162 of the tub 140. For instance, the lint filter 210 may include a filter member 212 formed at the outlet 162 and configured to pass air therethrough and to collect foreign materials, and a frame 214 fixed to the outlet 162 and configured to support the filter member 212. The filter member 212 may be formed as a mesh member having a network of a predetermined size.

The cleaning nozzle 220 configured to clean components inside the circulation path 160 may be provided at the circulation path 160. The water supply passage 240 configured to supply water may be connected to the cleaning nozzle 220. One side of the water supply passage 240 may be connected to the water supply source 242 (e.g., a faucet (tap) of a water supply (service)). The water supply valve 250 configured to open and close the water supply passage 240 may be provided at the water supply passage 240.

The cleaning nozzle 220 may include a lint filter nozzle 222 provided at the connection duct 165 and configured to inject water to the lint filter 210. A heat exchanger nozzle 232 may be provided at the heat exchange duct portion 166 and configured to inject water to the evaporator 186 (heat exchanger).

As shown in FIG. 7, the lint filter nozzle 222 may be disposed above the lint filter 210. With such a configuration, when the lint filter nozzle 222 injects water, lint attached to an upper stream side of the lint filter 210, e.g., a lower side of the lint filter 210 may be easily separated to drop and to be removed. The lint filter nozzle 222 may include a nozzle body 224 in which water is moveable, and a plurality of nozzle holes 225 penetratingly-formed at the nozzle body 224 and configured to inject water therethrough.

Figure 8:
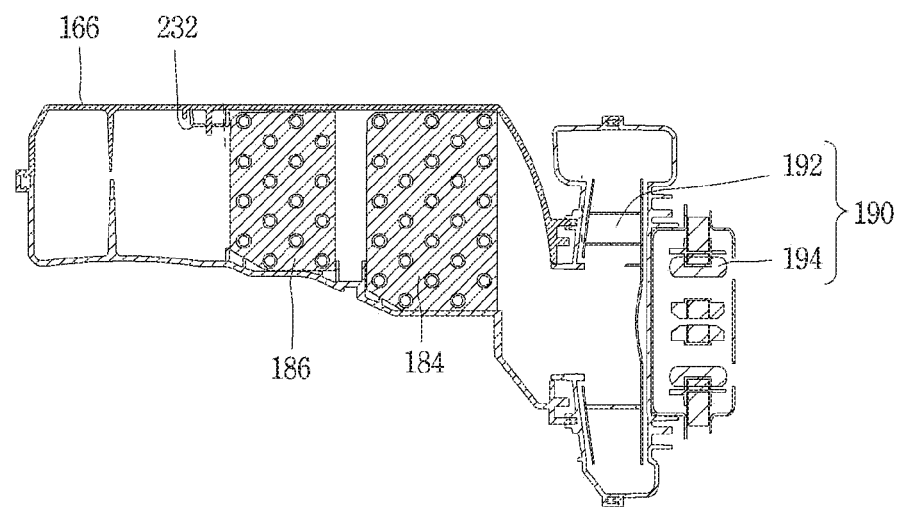
FIG. 8 is a sectional view taken along line 'VIII-VIII' in FIG. 6.

As shown in FIG. 8, the heat exchanger nozzle 232 may be provided at a front upper side of the evaporator 186 where a large amount of lint has been attached. With such a configuration, water may be easily injected into a front region of the evaporator 186 where a large amount of lint has been attached.

The heat exchanger nozzle 232 may be provided at a ceiling of the heat exchange duct portion 166. The heat exchanger nozzle 232 may be provided at an upper stream side of the evaporator 186 along a moving direction of air at the circulation path 160. A bottom surface of the heat exchange duct portion 166 may be formed to be inclined to one side such that water may be collected to be discharged.

A drain hole 168 (See FIG. 6) through which collected water is discharged may be formed at one side of the heat exchange duct portion 166. The drain hole 168 may be connected to a drain passage of the tub 140. With such a configuration, water discharged through the drain hole 168 may be discharged out when the tub 140 executes a drain course (e.g., cycle).

Referring to FIG. 6, the water supply passage 240 configured to supply water to the cleaning nozzle 220 may be formed in the cabinet 120. The water supply passage 240 may include a first water supply passage 243 connected to the lint filter nozzle 222, and a second water supply passage 244 connected to the heat exchanger nozzle 232.

The water supply valve 250 may include a first water supply valve 251 connected to the first water supply passage 243 and configured to open and close the first water supply passage 243, and a second water supply valve 252 connected to the second water supply passage 244 and configured to open and close the second water supply passage 244.

Figure 9:
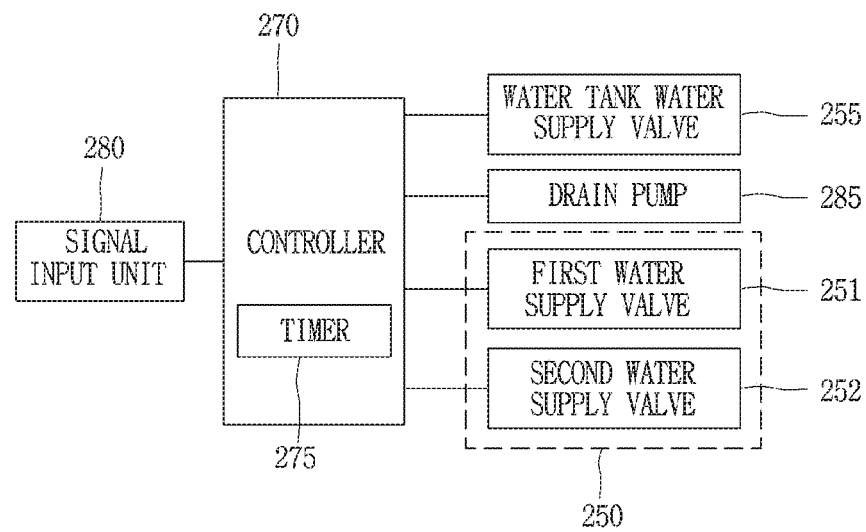
FIG. 9 is a control block diagram of the laundry treating apparatus of FIG. 1.

As shown in FIG. 9, the laundry treating apparatus according to an embodiment may include a controller 270. The container 270 may be formed as a micro-processor having a control program.

The controller 270 may control the water supply valve 250 such that water may be supplied to the cleaning nozzle 220 during a drain course. The drain course may be one among a plurality of drain courses for various courses such as a drain course of a washing course, a drain course of a rinsing course and a drain course of a final rinsing course.

With such a configuration, while the main body 110 is being operated, the circulation path 160 may be cleaned by the cleaning nozzle 220. This may allow an additional operation of the main body 110 for cleaning after a washing process to be excluded.

A drain pump 285, provided at the drain passage and configured to drain washing water inside the tub 140, may be connected to the controller 270. A signal input unit 280 configured to input a signal may be connected to the controller 270. The controller 270 may be provided with a timer 275 configured to calculate a time taken to perform each course, e.g., a washing course, a rinsing course and a final rinsing course.

The first water supply valve 251 and the second water supply valve 252 may be connected to the controller 270. The controller 270 may be configured to control the water supply valve 250 such that water may be supplied to the cleaning nozzle 220 in a discontinuous manner.

For example, the controller 270 may control the water supply valve such that the first and second water supply valves 251, 252 may be opened for a preset amount of time (e.g., 0.5~3 seconds) and then may be closed. In another example, controller 270 may control the water supply valve such that the first and second water supply valves 251, 252 may be opened and closed for the preset amount of time (e.g., 0.5~3 seconds) for a preset number of times (e.g., 7-15 times).

In this embodiment, the first and second water supply valves 251, 252 are opened and closed for the preset amount of time (e.g., 0.5~3 seconds) a preset number of times (e.g., 7-15 times). However, this is merely exemplary. That is, the number of times that the first and second water supply valves 251, 252 are opened and closed, and an opening time and a closing time (a time interval between the opening operation and the closing operation) may be properly controlled.

For instance, the controller 270 may control the water supply valve such that one of the first and second water supply valves 251, 252 may be opened and another thereof may be closed. With such a configuration, water may be continuously supplied from the water supply source 242. This may prevent a water hammer due to a drastic interruption of the water supply source 242.

The controller 270 may control the water supply valve 250 such that water may be supplied to the cleaning nozzle 220 at the time of a drain course of a washing course.

The controller 270 may control the water supply valve 250 such that water may be supplied to the cleaning nozzle 220 at the time of a drain course of a rinsing course.

The controller 270 may control the water supply valve 250 such that water may be supplied to the cleaning nozzle 220 at the time of a drain course of a final rinsing course.

The controller 270 may control the water supply valve 250 such that water may be supplied to the cleaning nozzle 220 at the time of the drain course of the washing course, the drain course of the rinsing course, and the drain course of the final rinsing course.

With such a configuration, once a washing course and a rinsing course are selected by the signal input unit 280, the controller 270 may sequentially execute the selected washing course and rinsing course. At the time of a preset drain course of the drain course of the washing course and/or the drain course of the rinsing course, the controller 270 may open and close the first and second water supply valves 251, 252, such that water may be supplied to the lint filter nozzle 222 and the heat exchanger nozzle 232, for a preset amount of time. With such a configuration, foreign materials of the lint filter 210 and foreign materials of the evaporator 186 may be removed.

The controller 270 may control the first and second water supply valves 251, 252 such that water may be supplied to the cleaning nozzle 220 after a water supplying course at the time of a washing course. With such a configuration, since the lint filter 210 and the heat exchanger may be cleaned at the time of the washing course, an additional driving for cleaning the lint filter 210 and the evaporator 186 may be excluded.

A tub water supply valve 255, provided at the tub water supply passage in order to supply water to the tub 140, may be connected to the controller 270. With such a configuration, once the washing course is started, the controller 270 may control the tub water supply valve 255 such that water may be supplied into the tub 140.

Once water supply into the tub 140 is started as the washing course is started, the controller 270 may control the first and second water supply valves 251, 252 to be sequentially open and closed with a time interval a predetermined number of times.

Hereinafter, a laundry treating apparatus according to another embodiment will be described with reference to FIG. 10. As aforementioned, a laundry treating apparatus may include a main body 110 having a tub 140, and having a circulation path 160 along which air inside the tub 140 is circulated after being taken out of the tub 140; a cleaning nozzle 220 provided at the circulation path 160, and configured to inject water; a water supply passage 240 having one side connected to a water supply source 242 and having another side connected to the cleaning nozzle 220; a water supply valve 250 configured to open and close the water supply passage 240; and a controller 270 (refer to FIG. 10) configured to control the water supply valve 250 such that water is supplied to the cleaning nozzle 220.

The controller 270 may be provided with a signal input unit 280 for inputting a signal, and a timer 275 for calculating a time taken to perform each course. The controller 270 may control the first water supply valve 251 such that water may be supplied to the lint filter nozzle 222 based on a sensed input current of a circulation fan 190 at the time of a drying cooling course of a drying course. The drying cooling course is a final stroke of the drying course, which means a process of cooling laundry which has contacted high-temperature air by contacting non-heated air at the time of the drying course.

At the time of the drying course, if the lint filter nozzle 222 is blocked, the input current of the circulation fan 190 may be lowered. Accordingly, the input current of the circulation fan 190 may be sensed, and an allowable limit may be set as a preset current value.

An input current sensor 290 configured to sense the input current of the circulation fan 190 may be connected to the controller 270. With such a configuration, a decrease of an air volume due to a blocked state of the lint filter nozzle 222, and lowering of drying efficiency may be prevented.

The controller 270 according to this embodiment may control the first water supply valve 251 such that water supply to the first water supply valve 251 may be restricted at a time prior to a termination time point (Te) of a drying course. The reason is in order to prevent laundry inside the drum 150 from re-absorbing moisture, even if the input current of the circulation fan 190 becomes lower than the preset current value.

The controller 270 may set a cleaning prohibition time point prior to the termination time point (Te) of the drying course by a preset time (T), and may control the first water supply valve 251 such that water supply to the first water supply valve 251 may be stopped, even if the input current of the circulation fan 190 sensed by the input current sensor 290 is lower than the preset current value at the cleaning prohibition time point.

Here, the cleaning prohibition time point means a time point when water supply to the lint filter nozzle is restricted. The cleaning prohibition time point may be set as a time point when the laundry can be sufficiently dried even if it contacts moisture. The cleaning prohibition time point may be set as a time point prior to the termination time point (Te) of the drying course (drying cooling course) by, for example, 35~45 minutes. The controller 270 may be provided with a calculation unit 277 configured to calculate a remaining time by deducting a preset time from the termination time point (Te) of the drying course.

At the time of the drying course, the controller 270 may detect an rpm of the drum 150. In this case, if the rpm of the drum 150 reaches a preset value, the controller 270 may control the first and second water supply valves 251, 252 such that water may be supplied to the lint filter nozzle 222 and the heat exchanger nozzle 232, respectively. The preset rpm of the drum 150 may be set as a speed high enough for washing water injected from the lint filter nozzle 222 as the drum 150 is rotated, to pass through the lint filter 210, to drop to an external surface of the drum 150, and then to bounce off or reflected from the drum 150. The preset rpm of the drum 150 may be 130 rpm, for instance.

With such a configuration, water is supplied to the lint filter nozzle 222 as the first water supply valve 251 is open, and water which drops to the inside of the tub 140 from the lint filter 210 bounces to the outside of the drum 150 by a rotation force of the drum 150, even if the dropping water contacts an outer surface of the drum 150. In this case, since the water is not introduced into the drum 150, laundry inside the drum 150 may be prevented from absorbing moisture.

The controller 270 may control an rpm sensor 295 to sense an rpm of the drum 150 at the time of a drying course. If the sensed rpm of the drum 150 is more than the preset rpm, the controller 270 may open and close the first and second water supply valves 251, 252 such that water may be supplied to the lint filter nozzle 222 and the heat exchanger nozzle 232, respectively.

Once the first water supply valve 251 is open, water may be supplied to the lint filter nozzle 222 and may be injected to the lint filter 210. In this case, if the water drops from the lint filter 210 together with foreign materials of the lint filter 210, the drum 150 is rotated with an rpm more than the preset rpm. As a result, the water and the foreign materials may bounce to the outside of the drum 150 without being introduced into the drum 150 due to a rotation force of the drum 150.

Once the second water supply valve 252 is open, water may be supplied to the heat exchanger nozzle 232, and the heat exchanger nozzle 232 may inject the water to a front surface of the evaporator 186. The water injected to the evaporator 186 may be used to wash foreign materials on the surface of the evaporator 186, e.g., lint, and then may move along an inclined bottom surface of the heat exchange duct portion 166, thereby being discharged out through the drain hole 168.

Hereinafter, a method for controlling a cleaning nozzle of a laundry treating apparatus according to an embodiment of the present disclosure will be described in more detail with reference to FIGS. 11 to 14.

Figure 11:
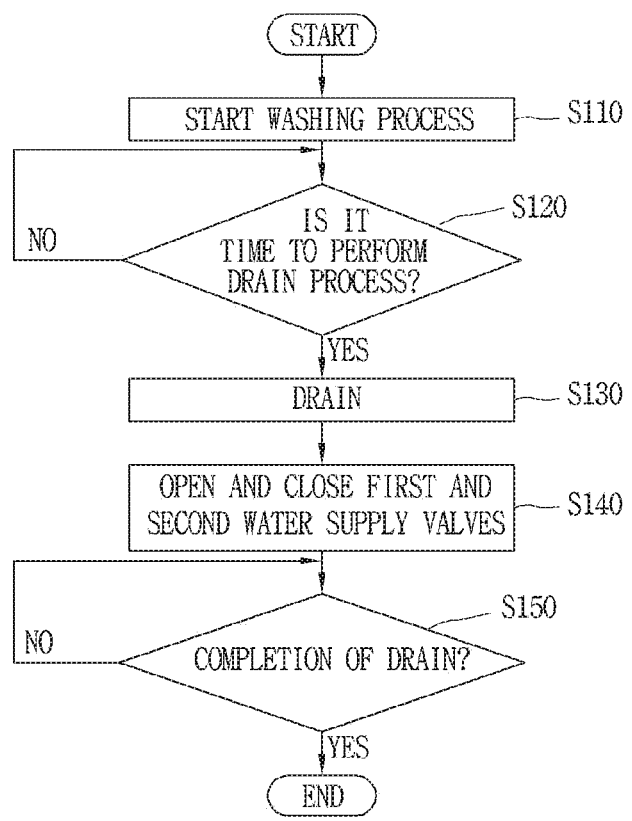
FIG. 11 is a flow chart of a method for controlling a cleaning nozzle of a laundry treating apparatus according to an embodiment.

As shown in FIGS. 9 and 11, the method for controlling a cleaning nozzle of a laundry treating apparatus according to an embodiment may be configured to control the first and second water supply valves 251, 252, such that water may be supplied to the lint filter nozzle 222 and the heat exchanger nozzle 232, respectively, at the time of a drain course of a washing course.

Once a washing course is started, in step S110, the controller 270 may check a progress state of the washing course through the timer 275. At the time of the drain course of the washing course, in step S120, the controller 270 may control a drain course to be executed by controlling the drain pump 285, in step S130.

Once the drain course is started, the controller 270 may control the first and second water supply valves 251, 252 to be opened and closed for a preset amount of time and a preset number of times, in step S140. With such a configuration, lint and foreign materials of the lint filter 210 and the evaporator 186 may be removed. If it is checked through the timer 275 that it is a drain termination time point, in step S150, the controller 270 may control the drain pump 285 to be stopped.

Figure 12:
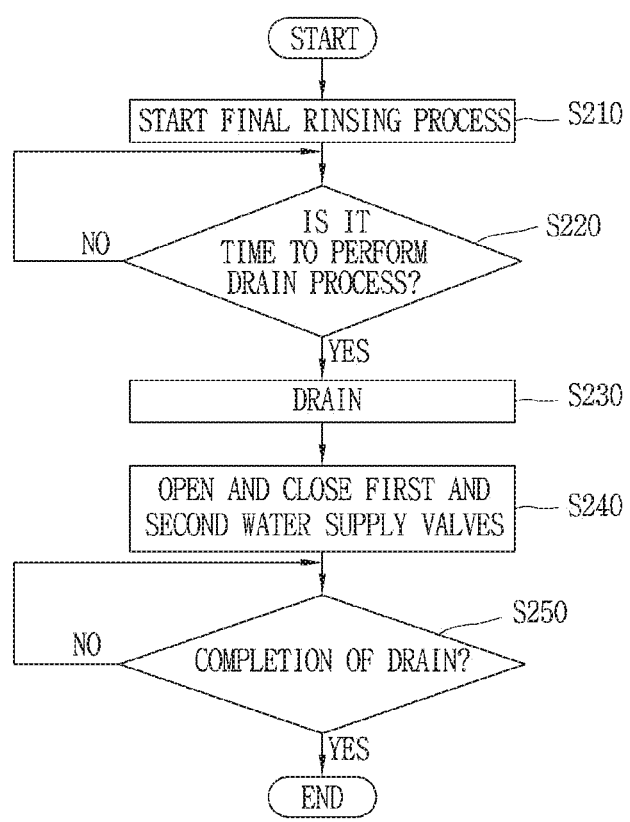
FIG. 12 is a flow chart of a method for controlling a cleaning nozzle of a laundry treating apparatus according to an embodiment.

As shown in FIGS. 9 and 12, a method for controlling a cleaning nozzle of a laundry treating apparatus according to another embodiment may be configured to control the water supply valve 250 (the first and second water supply valves 251, 252), such that water may be supplied to the cleaning nozzle 220 (the lint filter nozzle 222 and the heat exchanger nozzle 232) at the time of a drain course of a final rinsing course. Once a final rinsing course is started, in step S210, the controller 270 may check through the timer 275 whether it is a drain starting time point, in step S220.

At the time of the drain starting time point, the controller 270 may execute a drain course by controlling the drain pump 285, in step S230, and may control the first and second water supply valves 251, 252 to be opened and closed for a preset amount of time and a preset number of times, in step S240. With such a configuration, lint and foreign materials of the lint filter 210 and the evaporator 186 may be removed. If it is a drain termination time point, in step S250, the controller 270 may terminate the drain course by stopping the drain pump 285.

Figure 13:
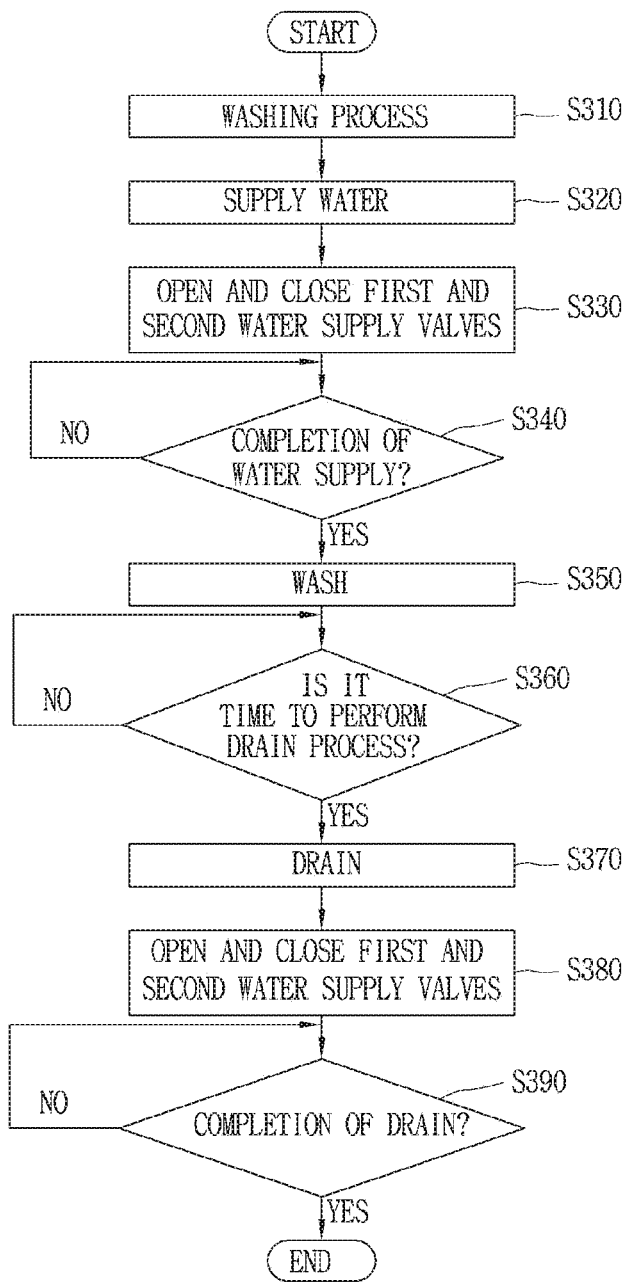
FIG. 13 is a flow chart of a method for controlling a cleaning nozzle of a laundry treating apparatus according to an embodiment.

As shown in FIGS. 9 and 13, a method for controlling a cleaning nozzle of a laundry treating apparatus according to another embodiment may be configured to control the water supply valve 250 (the first and second water supply valves 251, 252), such that water may be supplied to the cleaning nozzle 220 (the lint filter nozzle 222 and the heat exchanger nozzle 232) at the time of a water supplying course of a washing course and a drain course of a washing course.

Once the washing course is started, in step S310, the controller 270 may control water to be supplied to the inside of the tub 140, by controlling the tub water supply valve 255, in step S320. Once the water supply is started, the controller 270 may control the first and second water supply valves 251, 252 to be opened and closed for a preset amount of time and a preset number of times, in step S330. With such a configuration, water may be supplied to the lint filter nozzle 222 and the heat exchanger nozzle 232, thereby removing foreign materials of the lint filter 210 and the evaporator 186.

Once the water supply is completed, in step S340, the controller 270 may execute a washing course according to a program, in step S350. Then, the controller 270 may check, through the timer 275, whether it is time to perform the drain course of the washing course, in step S360. If it is time to perform the drain course of the washing course, in step S360, the controller 270 may execute the drain course by controlling the drain pump 285, in step S370, and may control the first and second water supply valves 251, 252 to be open and closed for a preset time and a preset number of times, in step S380. If it is checked through the timer 275 that it is a drain termination time point, in step S390, the controller 270 may terminate the drain course by stopping the drain pump 285.

Figure 10:
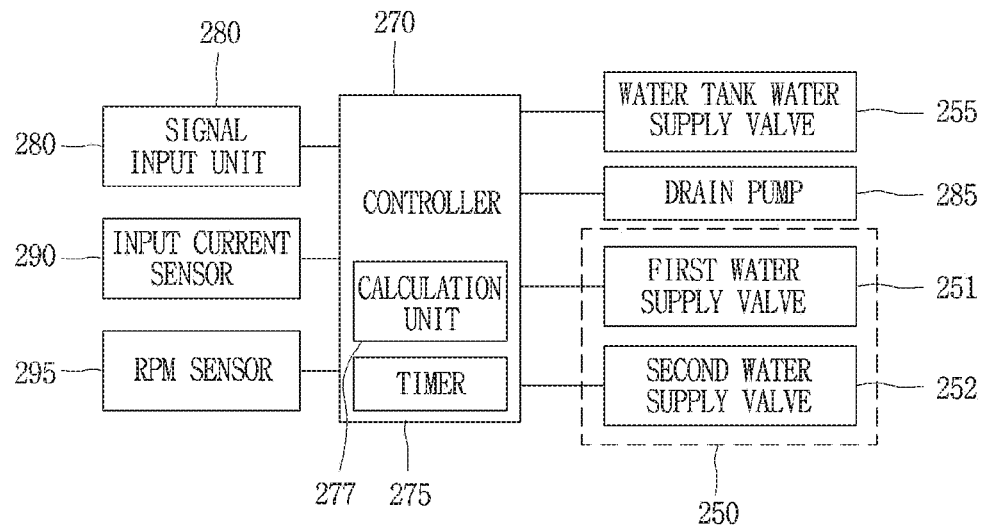
FIG. 10 is a control block diagram of a laundry treating apparatus according to an embodiment.
Figure 14A:
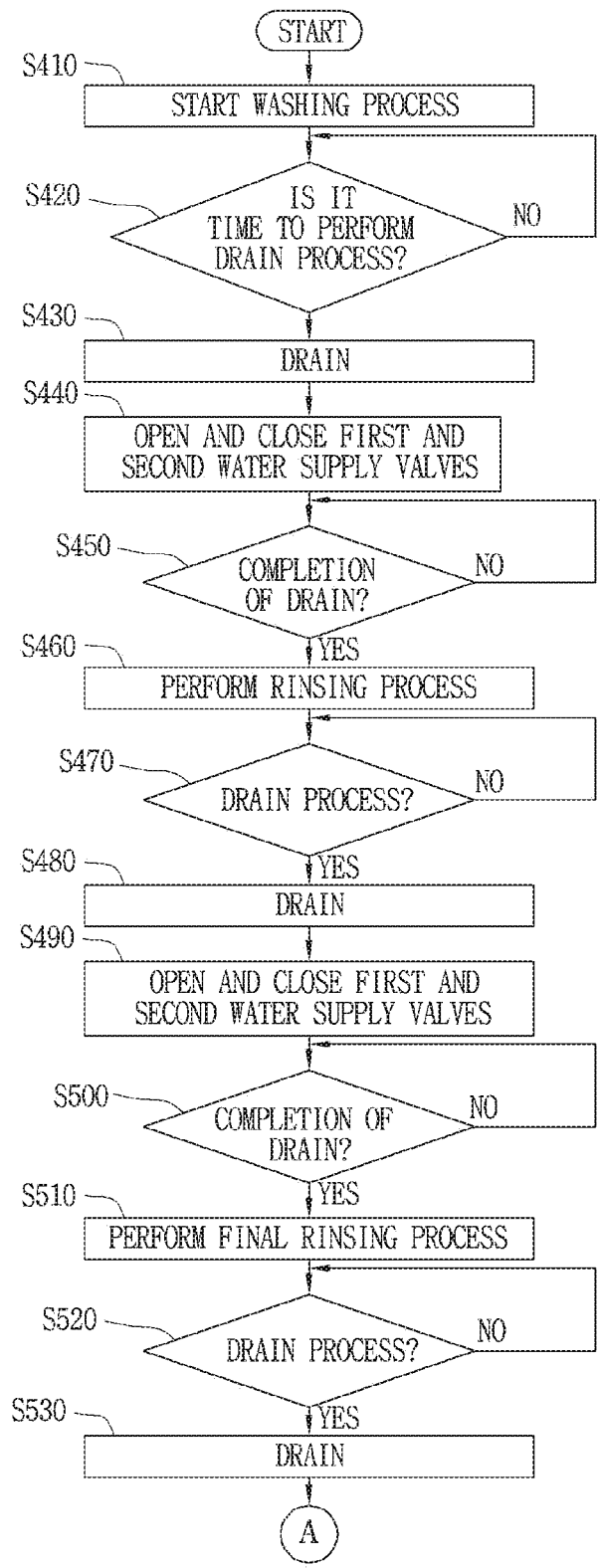
FIGS. 14A and 14B are flow charts of a method for controlling a cleaning nozzle of a laundry treating apparatus according to an embodiment.

As shown in FIGS. 10 and 14A, a method for controlling a cleaning nozzle of a laundry treating apparatus according to another embodiment may be configured to control the first and second water supply valves 251, 252, such that water may be supplied to the cleaning nozzle 220 at the time of a drain course of a washing course, a drain course of a rinsing course, a drain course of a final rinsing course, and a drying course.

Once a washing course is started, in step S410, the controller 270 may check, through the timer 275, whether it is time to perform the drain course of the washing course, in step S420. If it is time to perform the drain course of the washing course, the controller 270 may execute the drain course by controlling the drain pump 285, in step S430.

Once the drain course is started, the controller 270 may control the first and second water supply valves 251, 252 to be opened and closed for a preset amount of time and a preset number of times, in step S440. With such a configuration, water may be supplied to the lint filter nozzle 222 and the heat exchanger nozzle 232, thereby removing foreign materials of the lint filter 210 and the heat exchanger 186.

Once the drain course of the washing course is terminated, in step S450, the controller 270 may execute a rinsing course, in step S460. The controller 270 may check whether it is time to perform the drain course of the rinsing course, in step S470. Then, if the drain course of the rinsing course is started, in step S480, the controller 270 may control the first and second water supply valves 251, 252 to be opened and closed for a preset amount of time and a preset number of times, in step S490.

The controller 270 may check whether the drain course of the rinsing course has been terminated or not, in step S500, and may control a final rinsing course to be started, in step S510. The controller 270 may check whether it is time to perform the drain course of the final rinsing course, in step S520, and may execute the drain course of the final rinsing course, in step S530.

Figure 14B:
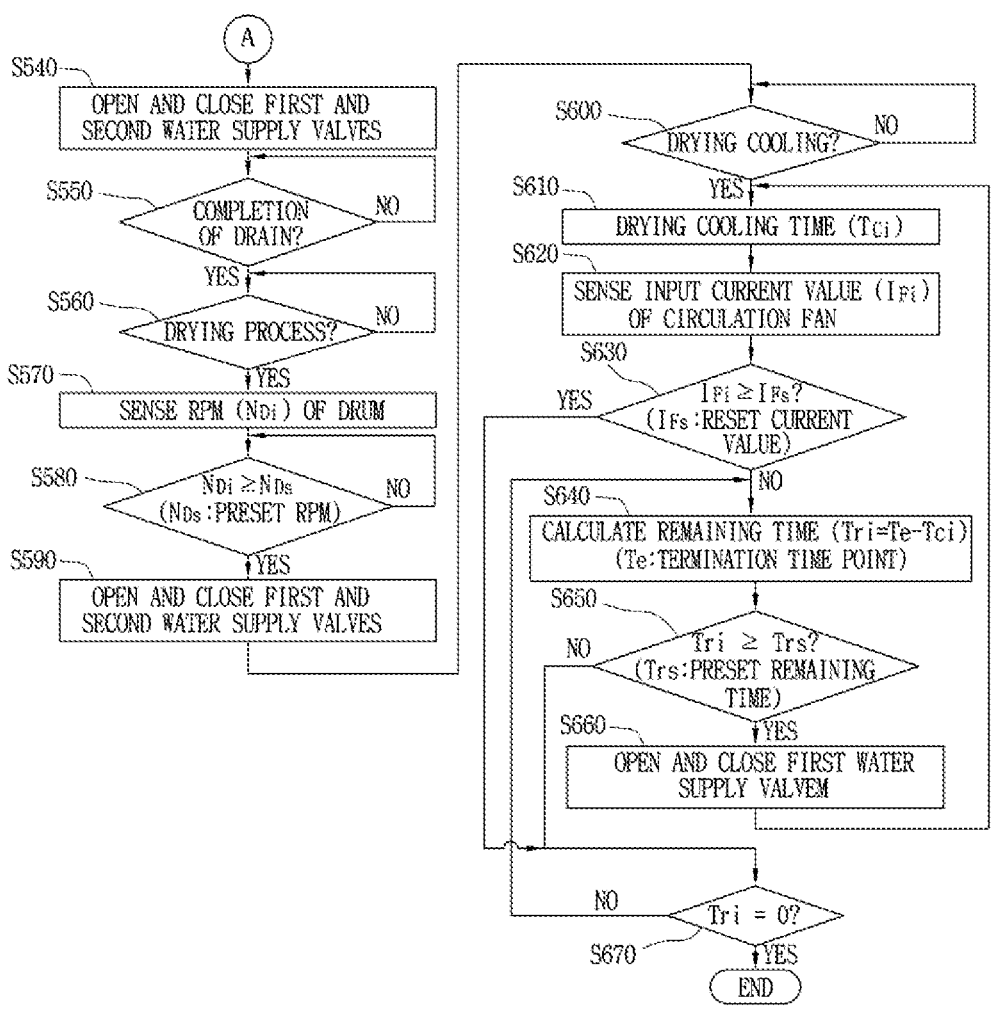

Referring to FIG. 14B, once the drain course of the final rinsing course is started, the controller 270 may control the first and second water supply valves 251, 252 to be opened and closed for a preset amount of time and a preset number of times, such that water may be supplied to the lint filter nozzle 222 and the heat exchanger nozzle 232, respectively, in step S540.

The controller 270 may check whether the drain course of the final rinsing course has been terminated or not. Then, if the drain course has been terminated, in step S550, the controller 270 may check whether it is time to perform a drying course, in step S560.

The controller 270 may sense an rpm ($N_{Di}$) of the drum 150 by the rpm sensor 295, in step S570. If the rpm ($N_{Di}$) of the drum 150 is more than a preset rpm ($N_{Ds}$), in step S580, the controller 270 may control the first and second water supply valves 251, 252 to be opened and closed for a preset amount of time and a preset number of times, such that water may be supplied to the lint filter nozzle 222 and the heat exchanger nozzle 232, in step S590.

The controller 270 may check whether it is time to perform a drying cooling course, in step S600. Once the drying cooling course is started, the controller 270 may count a drying cooling time ($T_{Ci}$), in step S610.

At the time of the drying cooling course, the controller 270 may control the input current sensor 290 such that an input current value ($I_{Fi}$) of the circulation fan 190 may be sensed, in step S620. If the input current value ($I_{Fi}$) of the circulation fan 190 is less than a preset current value ($I_{Fs}$), in step S630, the controller 270 may control the calculation unit 277 to calculate a remaining time (Tri) of the drying cooling course, by deducting the counted drying cooling time ($T_{Ci}$) from a termination time point (Te) of the drying cooling course, in step S640. If the remaining time (Tri) of the drying cooling course is more than a preset remaining time (Trs), in step S650, the controller 270 may control the first water supply valve 251 to be open, in step S660. With such a configuration, water is supplied to the lint filter nozzle 222 to remove foreign materials of the lint filter 210. This may solve a blocked state of the lint filter 210.

Moreover, the controller 270 may control the calculation unit 277 to calculate the remaining time (Tri), and may terminate the drying course when the remaining time (Tri) is zero, in step S670.

As aforementioned, according to an embodiment of the present disclosure, the apparatus and the method may have various advantages. Following is a non-exhaustive list of examples of the advantages.

Firstly, since water is supplied to be injected to the cleaning nozzle for cleaning at the time of at least one drain course of a plurality of drain courses, an additional cleaning operation is not required after a driving is completed.

Secondly, water is supplied to the lint filter and the heat exchanger at the time of at least one drain course among a plurality of drain courses, for automatic cleaning. This may enhance blowing efficiency and heat exchange efficiency.

Thirdly, the circulation path is automatically cleaned at the time of at least one drain course among a plurality of drain courses. This may allow a drying function to be executed before a drying course, in a state where foreign materials have been removed. This may enhance drying efficiency.

Fourthly, an input power of the circulation fan is sensed, and water is supplied to the cleaning nozzle when the input power is reduced. This may solve a blocked state of the lint filter nozzle due to foreign materials at the time of a drying course, thereby enhancing drying efficiency.

Therefore, an aspect of the detailed description is to provide a laundry treating apparatus capable of executing a cleaning operation while treating (processing) laundry, and a method for controlling a cleaning nozzle thereof.

Another aspect of the detailed description is to provide a laundry treating apparatus capable of enhancing blowing efficiency and heat exchange efficiency through an automatic cleaning, and a method for controlling a cleaning nozzle thereof.

Another aspect of the detailed description is to provide a laundry treating apparatus capable of executing a drying function in a state where foreign materials have been removed therefrom, and a method for controlling a cleaning nozzle thereof.

Another aspect of the detailed description is to provide a laundry treating apparatus capable of solving its blocked state due to foreign materials at the time of a drying course, and a method for controlling a cleaning nozzle thereof.

To achieve these and other advantages and in accordance with the purpose of this specification, as embodied and broadly described herein, there is provided a laundry treating apparatus which may include: a main body having a tub, and having a circulation path along which air inside the tub is circulated after being taken out of the tub; a cleaning nozzle provided at the circulation path, and configured to inject water; a water supply passage having one side connected to a water supply source and having another side connected to the cleaning nozzle; a water supply valve configured to open and close the water supply passage; and a controller configured to control the water supply valve such that water is supplied to the cleaning nozzle. The controller may control the water supply valve such that water is supplied to the cleaning nozzle, at the time of at least one drain course among a plurality of drain courses.

The main body may include a cabinet which forms appearance, and a drum provided in the tub, and formed to be rotatable. The water supply source may be a faucet (tap) of a water supply (service)).

The controller may control the water supply valve such that water may be supplied to the cleaning nozzle, at the time of a drain course of a washing course. The controller may control the water supply valve such that water may be supplied to the cleaning nozzle, at the time of a drain course of a final rinsing course. The controller may also control the water supply valve such that water may be supplied to the cleaning nozzle, at the time of a drain course of a rinsing course.

The circulation path may include a lint filter configured to collect lint from the air which moves along the circulation path, and a heat pump having a heat exchanger for heat-exchanging with the air which moves along the circulation path. In an embodiment, the cleaning nozzle may include a lint filter nozzle configured to inject water to the lint filter and a heat exchanger nozzle configured to inject water to the heat exchanger.

The water supply passage may include a first water supply passage having one side connected to the water supply source, and another side connected to the lint filter nozzle and a second water supply passage having one side connected to the water supply source, and another side connected to the heat exchanger nozzle. In an embodiment, the water supply valve may include: a first water supply valve provided at the first water supply passage; and a second water supply valve provided at the second water supply passage.

The circulation path may be provided with an inlet connected to the tub for communication, and the lint filter may be disposed at the inlet. And the lint filter nozzle may be disposed above the lint filter to downward inject water. The circulation path may be provided with a heat exchange duct portion for accommodating the heat exchanger therein, and the heat exchanger nozzle may be provided at an upper region of an upstream side of the heat exchanger in a moving direction of the air at the circulation path, such that water may be downward injected toward the heat exchanger.

The controller may sense an rpm of a drum inside the tub at the time of a drying course. When the sensed rpm of the drum is more than a preset rpm, the controller may control the first and second water supply valves such that water may be supplied to the lint filter nozzle and the heat exchanger nozzle, respectively.

The laundry treating apparatus may further include a circulation fan provided at the circulation path and configured to accelerate circulation of the air at the circulation path, and an input current sensor configured to sense an input current of the circulation fan. If the input current of the circulation fan sensed by the input current sensor is less than a preset current value at the time of a drying cooling course of a drying course, the controller may control the first water supply valve such that water may be supplied to the lint filter nozzle.

In an embodiment, at the time of a cleaning prohibition time point which is set to be prior to a termination time point of the drying cooling course by a preset time interval, the controller may control the first water supply valve such that water supply to the lint filter nozzle may be interrupted.

According to another aspect of the present invention, there is provided a laundry treating apparatus which may include: a main body having a tub, and having a circulation path along which air inside the tub is circulated after being taken out of the tub; a cleaning nozzle provided at the circulation path, and configured to inject water; a water supply passage having one side connected to a water supply source and having another side connected to the cleaning nozzle; a water supply valve configured to open and close the water supply passage; and a controller configured to control the water supply valve such that water is supplied to the cleaning nozzle. The controller controls the water supply valve such that water is supplied to the cleaning nozzle, at the time of a water supplying course or at the time of at least one drain course among a drain course of a washing course, a drain course of a rinsing course, and a drain course of a final rinsing course.

According to another aspect of the present invention, there is provided a laundry treating apparatus which may include: a main body having a tub, and having a circulation path along which air inside the tub is circulated after being taken out of the tub; a cleaning nozzle provided at the circulation path, and configured to inject water; a water supply passage having one side connected to a water supply source and having another side connected to the cleaning nozzle; a water supply valve configured to open and close the water supply passage; and a controller configured to control the water supply valve such that water is supplied to the cleaning nozzle. The controller controls the water supply valve such that water is supplied to the cleaning nozzle, at the time of at least one drain course among a drain course of a washing course, a drain course of a rinsing course and a drain course of a final rinsing course, or at the time of a drying course.

To achieve these and other advantages and in accordance with the purpose of this specification, as embodied and broadly described herein, there is also provided a method for controlling a cleaning nozzle of a laundry treating apparatus which may include: a main body having a tub, and having a circulation path along which air inside the tub is circulated after being taken out of the tub; a cleaning nozzle provided at the circulation path, and configured to inject water; a water supply passage having one side connected to a water supply source and having another side connected to the cleaning nozzle; and a water supply valve configured to open and close the water supply passage, the method including: checking whether it is time to perform a drain course; and if it is time to perform the drain course, controlling the water supply valve such that water is supplied to the cleaning nozzle.

The method may further include: sensing an rpm of a drum at the time of a drying course; comparing the sensed rpm of the drum with a preset rpm; and if the sensed rpm of the drum is more than the preset rpm, controlling the water supply valve such that water is supplied to the cleaning nozzle.

According to another aspect of the present invention, there is provided a method for controlling a cleaning nozzle of a laundry treating apparatus which may include: a main body having a tub, and having a circulation path along which air inside the tub is circulated after being taken out of the tub; a circulation fan provided at the circulation path and configured to accelerate an air flow; a lint filter configured to collect lint from the air which moves along the circulation path; a heat pump having a heat exchanger for heat-exchanging with the air which moves along the circulation path; a lint filter nozzle configured to inject water to the lint filter; a heat exchanger nozzle configured to inject water to the heat exchanger; a first water supply passage having one side connected to the water supply source, and another side connected to the lint filter nozzle; a second water supply passage having one side connected to the water supply source, and another side connected to the heat exchanger nozzle; a first water supply valve provided at the first water supply passage; and a second water supply valve provided at the second water supply passage, the method including: checking whether it is time to perform a drain course; and if it is time to perform the drain course, controlling the first and second water supply valves such that water is supplied to the lint filter nozzle and the heat exchanger nozzle, respectively.

The method may further include: sensing an input current of the circulation fan at the time of a drying cooling course of a drying course; comparing the sensed input current of the circulation fan with a preset current value; and if the sensed input current of the circulation fan is less than the preset current value, controlling the first water supply valve such that water is supplied to the lint filter nozzle.

The method may further include: checking whether it is a cleaning prohibition time point which is set to be prior to a termination time point of the drying cooling course by a preset time interval, at the time of the drying cooling course of the drying course; and if it is the cleaning prohibition time point after the drying cooling course is started, controlling the first water supply valve such that water supply to the lint filter nozzle is interrupted.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laundry treating apparatus, comprising:
a main body having a tub, a drum disposed inside the tub, and a circulation path to circulate air from the tub;
a lint filter provided in the circulation path;
a lint filter nozzle provided in the circulation path to inject water to the lint filter;
a first water supply passage having one side connected to a water supply source and another side connected to the lint filter nozzle;
a first water supply valve to open and close the first water supply passage;
an rpm sensor to sense an rpm of the drum; and
a controller configured to:
  determine that the laundry treating apparatus is to operate in a drying course;
  when the laundry treating apparatus is determined to operate in the drying course, determine when the sensed rpm of the drum is more than a prescribed rpm; and
  in response to the determination that the sensed rpm of the drum during the drying course is more than the prescribed rpm, control the first water supply valve to supply water to the lint filter nozzle during the drying course, and
wherein the prescribed rpm is set such that water dropping toward the drum through the lint filter bounces to outside of the drum by a rotation force of the drum without being introduced into the drum,
wherein the controller is configured to control the first water supply valve to be opened and closed a prescribed number of times such that water is intermittently supplied to the lint filter when the rpm of the drum sensed by the rpm sensor, during the drying course, is more than the prescribed rpm.

2. The apparatus of claim 1, wherein the prescribed rpm is set to 130 rpm.

3. The apparatus of claim 1, wherein the circulation path comprises a circulation fan,
   wherein the circulation path further comprises an input current sensor to sense an input current of the circulation fan,
   wherein the drying course includes a drying cooling course to cool laundry inside the drum by bringing the laundry in contact with unheated air, and
   wherein the controller is configured to control the first water supply valve to be opened and closed when the input current of the circulation fan sensed by the input current sensor is less than a prescribed current value during the drying cooling course.

4. The apparatus of claim 3, wherein a cleaning prohibition time point is set a prescribed time interval prior to a termination time point of the drying cooling course, and
   wherein the controller is configured to control the first water supply valve such that water supply to the lint filter nozzle is interrupted at the cleaning prohibition time point.

5. The apparatus of claim 1, further comprising:
   a heat exchanger provided in the circulation path;
   a heat exchanger nozzle to inject water to the heat exchanger;
   a second water supply passage connected to the heat exchanger nozzle; and
   a second water supply valve to open and close the second water supply passage,
   wherein the controller is configured to control the second water supply valve to supply water to the heat exchanger when the rpm of the drum sensed by the rpm sensor, during the drying course, is more than the prescribed rpm.

6. The apparatus of claim 5, wherein the controller is configured to control the second water supply valve to be opened and closed a prescribed number of times such that water is intermittently supplied to the heat exchanger when the rpm of the drum sensed by the rpm sensor, during the drying course, is more than the prescribed rpm.

7. The apparatus of claim 6, wherein the prescribed number of times of the second water supply valve set to intermittently supply water to the heat exchanger is 7 to 15 times.

8. The apparatus of claim 6, wherein the controller is configured to control the second water supply valve to be opened for a prescribed time and then closed such that water is intermittently supplied to the heat exchanger when the rpm of the drum sensed by the rpm sensor, during the drying course, is more than the prescribed rpm.

9. The apparatus of claim 8, wherein the prescribed time of the second water supply valve set to intermittently supply water to the heat exchanger is 0.5 to 3 seconds.

10. The apparatus of claim 5, wherein the controller is configured to control the second water supply valve such that water is supplied to the heat exchanger during a drain course of a rinsing course.

11. The apparatus of claim 5, wherein the controller is configured to control the first water supply valve such that water is supplied to the lint filter during a drain course of a final rinsing course.

12. The apparatus of claim 5, wherein the controller is configured to control the first water supply valve such that water is supplied to the lint filter during a drain course of a cleaning course, during a drain course of a rinsing course, and during a drain course of a final rinsing course, respectively.

13. The apparatus of claim 1, wherein the controller is configured to control the first water supply valve such that water is supplied to the lint filter during a drain course of a cleaning course.

14. The apparatus of claim 1, wherein the controller is configured to control the first water supply valve such that water is supplied to the lint filter during a drain course of a rinsing course.

15. The apparatus of claim 1, wherein the controller is configured to control the first water supply valve such that water is supplied to the lint filter during a drain course of a final rinsing course.

16. The apparatus of claim 1, wherein the controller is configured to control the first water supply valve such that water is supplied to the lint filter during a drain course of a cleaning course, during a drain course of a rinsing course, and during a drain course of a final rinsing course, respectively.

17. The apparatus of claim 1, wherein the prescribed number of times of the first water supply valve set to intermittently supply water to the lint filter is 7 to 15 times.

18. The apparatus of claim 1, wherein the controller is configured to control the first water supply valve to be opened for a prescribed time and then closed such that water is intermittently supplied to the lint filter when the rpm of the drum sensed by the rpm sensor, during the drying course, is more than the prescribed rpm.

19. The apparatus of claim 18, wherein the prescribed time of the first water supply valve set to intermittently supply water to the lint filter is 0.5 to 3 seconds.

* * * * *